(12) United States Patent
Takegami et al.

(10) Patent No.: US 8,817,490 B2
(45) Date of Patent: Aug. 26, 2014

(54) DC-DC CONVERTER

(71) Applicant: TDK Corporation, Tokyo (JP)

(72) Inventors: Eiji Takegami, Tokyo (JP); Jun Kawakami, Tokyo (JP); Takeshi Kamono, Tokyo (JP)

(73) Assignee: TDK Corporation (JP)

( * ) Notice: Subject to any disclaimer, the term of this patent is extended or adjusted under 35 U.S.C. 154(b) by 6 days.

(21) Appl. No.: 13/724,073

(22) Filed: Dec. 21, 2012

(65) Prior Publication Data

US 2013/0121034 A1     May 16, 2013

Related U.S. Application Data

(63) Continuation-in-part of application No. 13/159,011, filed on Jun. 13, 2011.

(30) Foreign Application Priority Data

Dec. 28, 2011    (JP) ................................ 2011-288573

(51) Int. Cl.
*H02M 3/335*      (2006.01)
*H02J 7/00*       (2006.01)

(52) U.S. Cl.
USPC ........................................... 363/16; 320/166

(58) Field of Classification Search
USPC ........................................... 363/16; 320/166
See application file for complete search history.

(56) References Cited

U.S. PATENT DOCUMENTS 5,798,633 A    8/1998   Larsen et al.
6,876,556 B2 *   4/2005   Zhu et al. ...................... 363/17
7,450,401 B2 *   11/2008   Iida ............................... 363/16

2002/0186576 A1   12/2002   Kanouda et al.
2006/0132102 A1 *   6/2006   Harvey .................... 320/166
2008/0062724 A1   3/2008   Feng et al.
2008/0219032 A1   9/2008   Stancu et al.

(Continued)

FOREIGN PATENT DOCUMENTS

DE    10 2008 011 307 A1    9/2008
DE    10 2012 111 063 A1    5/2013

(Continued)

OTHER PUBLICATIONS

Li et al., Analysis and Design of Improved Isolated Full-Bridge Bi-Directional DC-DC Converter, Jun. 2004, IEEE, 35th Annual IEEE PESC, 521-526.*

*Primary Examiner* — Jue Zhang
(74) *Attorney, Agent, or Firm* — Harness, Dickey & Pierce, P.L.C.

(57) ABSTRACT

A DC-DC converter is configured with a voltage-source power converter at a primary side of a transformer, a current-source power converter at a secondary side of the transformer, and a controller. First and second voltage detection circuits respectively detect first and second voltages of the voltage-source and the current-source power converters. A current detection circuit detects an input-output current of the current-source power converter. The controller controls the voltage-source and the current-source power converters to transfer power between the primary side and the secondary side of the transformer. The controller includes a calculation unit that performs calculations based on the first voltage, the second voltage and the input-output current, and a table unit that include a plurality of parameter sets. The calculation unit performs the calculations based on one of the plurality of parameter sets that is selected from the table unit.

12 Claims, 10 Drawing Sheets

(56) References Cited

U.S. PATENT DOCUMENTS

| | | | |
|---|---|---|---|
| 2008/0284387 A1* | 11/2008 | Chen et al. | 323/222 |
| 2009/0108677 A1 | 4/2009 | Walter et al. | |
| 2010/0045102 A1 | 2/2010 | Kitanaka | |
| 2011/0037319 A1* | 2/2011 | Matsui et al. | 307/43 |
| 2011/0310637 A1 | 12/2011 | Takegami | |

FOREIGN PATENT DOCUMENTS

| | | |
|---|---|---|
| DE | 10 2012 111 607 A1 | 7/2013 |
| JP | 06-245501 | 9/1994 |
| JP | 11-008910 | 1/1999 |
| JP | 2002-165448 | 6/2002 |
| JP | 2006-081263 | 3/2006 |
| JP | 2006-187147 A | 7/2006 |
| JP | 2008-035675 | 2/2008 |
| JP | 2008-035675 A | 2/2008 |
| JP | 2008-228487 A | 9/2008 |
| JP | 2011-055602 A | 3/2011 |
| JP | 2012-005266 | 1/2012 |
| JP | 2012-005266 A | 1/2012 |

* cited by examiner

| Terminal 1 | Terminal 2 | Terminal 3 | Operation Setting |
|---|---|---|---|
| L | L | L | Parameter Set 1 |
| H | L | L | Parameter Set 2 |
| L | H | L | Parameter Set 3 |
| H | H | L | Parameter Set 4 |
| ... | ... | ... | ... |
| ... | ... | ... | ... |

DC-DC CONVERTER

CROSS-REFERENCE TO RELATED APPLICATION

This application claims priority to Japanese Patent Application No. 2011-288573 filed Dec. 28, 2011 which is hereby expressly incorporated by reference herein in its entirety.

BACKGROUND

The present invention relates to a DC-DC converter. Specifically, the present invention relates to a bidirectional DC-DC converter.

Japanese Patent Publication No. 2008-35675 discloses a bidirectional DC-DC converter that can be used in the case of powering and regenerating an electric motor or in the case of discharging and charging a storage battery.

However, a conventional bidirectional DC-DC converter cannot easily switch from a powering state to a regenerating state or from the regenerating state to the powering state. In addition, because it is necessary to perform control in both powering and regenerating states, there is also a problem in that the control system is complicated.

Therefore, an object of the present invention is to provide a DC-DC converter that can easily switch from a powering state to a regenerating state or from the regenerating state to the powering state.

SUMMARY

To solve the above problems, a DC-DC converter according to a first aspect of the present invention includes a transformer, a voltage-source power converter that is provided at a primary side of the transformer, a first voltage detection circuit that detects a first voltage between first input and output terminals of the voltage-source power converter, a current-source power converter that is provided at a secondary side of the transformer, a second voltage detection circuit that detects a second voltage between second input and output terminals of the current-source power converter, a current detection circuit that detects an input-output current between the second input and output terminals of the current-source power converter, and a controller that controls the voltage-source power converter and the current-source power converter to transfer power between the primary side and the secondary side of the transformer. The controller includes a calculation unit that performs calculations based on the first voltage, the second voltage and the input-output current, and a table unit that include a plurality of parameter sets. The calculation unit performs the calculations based on one of the plurality of parameter sets that is selected from the table unit.

In the DC-DC converter according to the first aspect of the present invention, the controller has at least one input terminal to which a signal is input. The controller selects one of the plurality of parameter sets from the table unit based on the input signal.

In the DC-DC converter according to the first aspect of the present invention, the controller selects one of the plurality of parameter sets from the table unit when the DC-DC converter starts to operate.

In the DC-DC converter according to the first aspect of the present invention, the controller further includes a communication interface unit that receives external information. The controller selects one of the plurality of parameter sets from the table unit based on the external information.

In the DC-DC converter according to the first aspect of the present invention, the controller further includes the communication interface unit that receives the external information. The controller updates the plurality of parameter sets of the table unit based on the external information.

A DC-DC converter according to a second aspect of the present invention includes a transformer, a voltage-source power converter that is provided at a primary side of the transformer, a first voltage detection circuit that detects a first voltage between first input and output terminals of the voltage-source power converter, a current detection circuit that detects an input-output current between the first input and output terminals of the voltage-source power converter, a current-source power converter that is provided at a secondary side of the transformer, a second voltage detection circuit that detects a second voltage between second input and output terminals of the current-source power converter, and a controller that controls the voltage-source power converter and the current-source power converter to transfer power between the primary side and the secondary side of the transformer. The controller includes a calculation unit that performs calculations based on the first voltage, the second voltage and the input-output current, and a table unit that include a plurality of parameter sets. The calculation unit performs the calculations based on one of the plurality of parameter sets that is selected from the table unit.

In the DC-DC converter according to the second aspect of the present invention, the controller has at least one input terminal to which a signal is input. The controller selects one of the plurality of parameter sets from the table unit based on the input signal.

In the DC-DC converter according to the second aspect of the present invention, the controller selects one of the plurality of parameter sets from the table unit when the DC-DC converter starts to operate.

In the DC-DC converter according to the second aspect of the present invention, the controller further includes a communication interface unit that receives external information. The controller selects one of the plurality of parameter sets from the table unit based on the external information.

In the DC-DC converter according to the second aspect of the present invention, the controller further includes the communication interface unit that receives the external information. The controller updates the plurality of parameter sets of the table unit based on the external information.

As explained above, the present invention easy switching from a powering state to a regeneration state or from the regeneration state to the powering state.

DESCRIPTION OF EXEMPLARY EMBODIMENTS

As discussed below, a DC-DC converter according to an embodiment of the present invention is explained with reference to the drawings.

Figure 1:
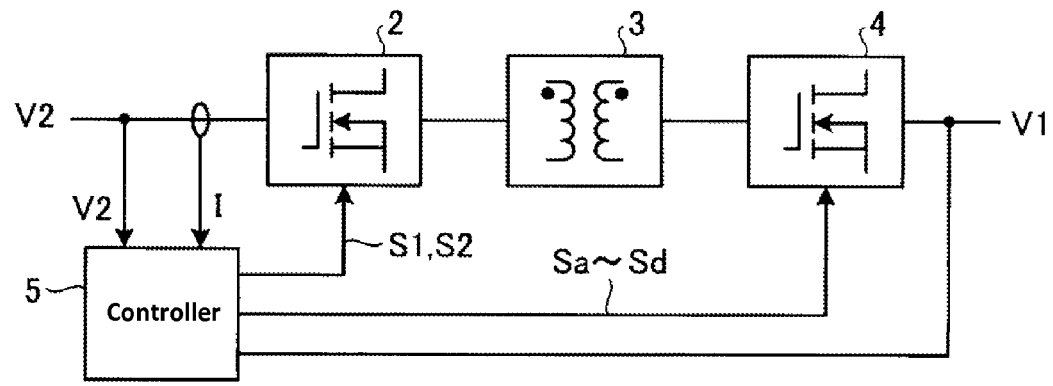
FIG. 1 is a block diagram of a DC-DC converter according to a first embodiment of the present invention.

FIG. 1 is a block diagram of a DC-DC converter according to a first embodiment of the present invention.

In FIG. 1, the DC-DC converter is configured with a transformer 3, a voltage-source power converter 4 that performs power conversion by controlling a voltage that is applied to a primary side of the transformer 3, a current-source power converter 2 that performs the power conversion by controlling an electric current that flows in a secondary side of the transformer 3, and a controller 5 that controls both the voltage-source power converter 4 and the current-source power converter 2.

When the power conversion is performed from the secondary side to the primary side of the transformer 3, a current, which is input to input and output terminals of the current-source power converter 2, is converted to an alternating current (AC) by the current-source power converter 2. The alternating current is supplied to the voltage-source power converter 4 through the transformer 3. Further, the alternating current, which is supplied to the voltage-source power converter 4 through the transformer 3, is converted to direct current (DC) by the voltage-source power converter 4. The direct current is output from input and output terminals of the voltage-source power converter 4.

When the power conversion is performed from the primary side to the secondary side of the transformer 3, a direct current, which is input from the input and output terminals of the voltage-source power converter 4, is converted to an alternating current by the voltage-source power converter 4. The alternating current is supplied to the current-source power converter 2 through the transformer 3. Further, the alternating current, which is supplied to the current-source power converter 2 through the transformer 3, is converted to direct current by the current-source power converter 2. The direct current is output from the input and output terminals of the current-source power converter 2.

A voltage between the input and output terminals of the current-source power converter 2 is a voltage V2. A voltage between the input and output terminals of the voltage-source power converter 4 is a voltage V1. An electric current, which is output from the input and output terminals of the current-source power converter 2, is a current I. A value of the current I becomes a positive value when the electric current is output from the input and output terminals of the current-source power converter 2. The value of the current I becomes a negative value when the electric current flows into the input and output terminals of the current-source power converter 2. The controller 5 controls the increase and the decrease of the current I with reference to the voltage V1, the voltage V2 and the current I.

When the power conversion is performed from the primary side to the secondary side of the transformer 3, the controller 5 controls the increase and the decrease of the current (I), which is output from the input and output terminals of the current-source power converter 2, with reference to the voltage V1, the voltage V2 and the current I. For instance, when it is desired to increase the voltage V2 or to decrease the voltage V1, the current-source power converter 2 and voltage-source power converter 4 are controlled so as to increase the current (I), which is output from the input and output terminals of the current-source power converter 2. Similarly, when it is desired to decrease the voltage V2 or to increase the voltage V1, the current-source power converter 2 and the voltage-source power converter 4 are controlled so as to decrease the current (I), which is output from the input and output terminals of the current-source power converter 2. On the other hand, when the power conversion is performed from the secondary side to the primary side of the transformer 3, the controller 5 controls the increase and the decrease of the current (−I) which flows into the input and output terminals of the current-source power converter 2 with reference to the voltage V1, the voltage V2 and the current I. For instance, when it is desired to increase the voltage V1, the current-source power converter 2 and the voltage-source power converter 4 are controlled so as to increase the current (−I), which flows into the input and output terminals of the current-source power converter 2 (this means that the absolute value of the current I, which is the negative value, is larger). Similarly, when it is desired to decrease the voltage V1, the current-source power converter 2 and the voltage-source power converter 4 are controlled so as to decrease the current (−I), which flows into the input and output terminals of the current-source power converter 2 (this means that the absolute value of current I, which is the negative value, is smaller).

Figure 2:
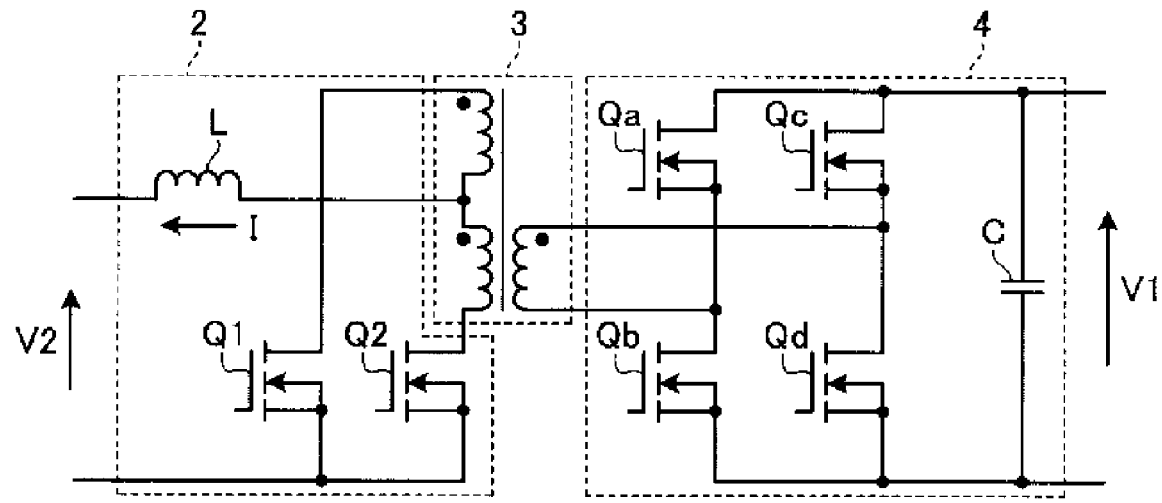
FIG. 2 is a circuit diagram of a current-source power converter 2, a transformer 3 and a voltage-source power converter 4 shown in FIG. 1.

FIG. 2 is a circuit diagram that shows a basic configuration of the current-source power converter 2, the transformer 3 and the voltage-source power converter 4 shown in FIG. 1. In the embodiment shown in FIG. 2, a push-pull configuration is employed as the current-source power converter 2 and a full bridge configuration is employed as the voltage-source power converter 4.

The current-source power converter 2 is configured with switching elements Q1, Q2 and an inductor L as main components. The switching element Q1 is connected between one end of a secondary winding of the transformer 3 and a negative terminal. The switching element Q2 is connected between another end of the secondary winding of the transformer 3 and the negative terminal. Further, the inductor L is connected between a center tap of the secondary winding of the transformer 3 and a positive terminal.

The input and output terminals of the current-source power converter 2 are configured with the positive terminal and the negative terminal. A voltage between the positive terminal and the negative terminal corresponds to the voltage V2.

The voltage-source power converter 4 is configured with switching elements Qa-Qd and a smoothing capacitor C as main components. The switching elements Qa, Qb are connected to each other in series and the switching elements Qc, Qd are connected to each other in series. A series circuit of the switching elements Qa, Qb and a series circuit of the switching elements Qc, Qd are connected to each other in parallel. A primary winding of the transformer 3 is connected between a node connecting the switching elements Qa, Qb and a node connecting the switching elements Qc, Qd. Further, the series circuit of the switching elements Qa, Qb, the series circuit of the switching elements Qc, Qd and the smoothing capacitor C are connected between a positive terminal and a negative terminal. The input and output terminals of the voltage-source power converter 4 are configured with the positive terminal and the negative terminal. The voltage between the positive terminal and the negative terminal corresponds to the voltage V1.

A field effect transistor, a bipolar transistor or an IGBT can be used for the switching elements Q1, Q2 and Qa-Qd. A body diode can also be formed in the switching elements Q1, Q2 and Qa-Qd.

Figure 3:
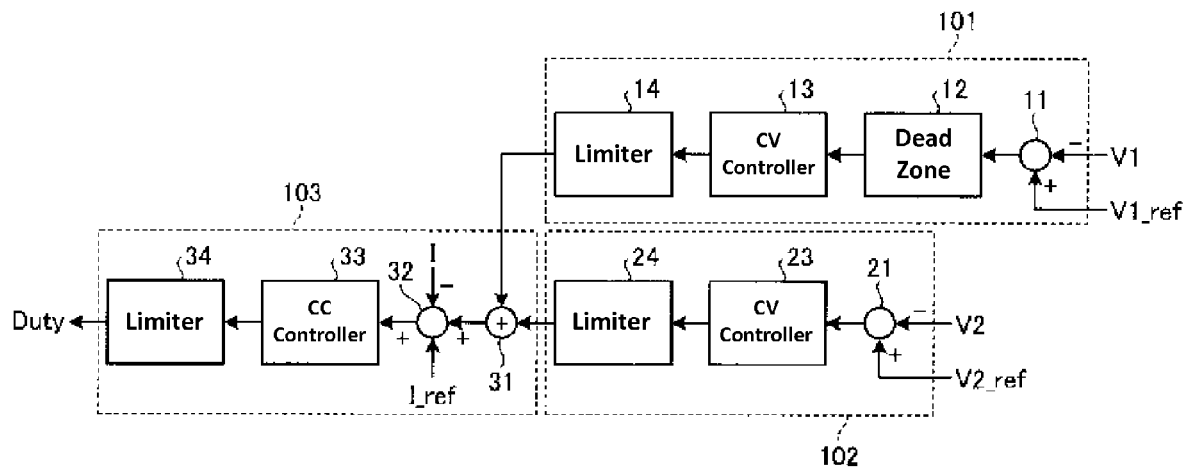
FIG. 3 is a block diagram of a controller 5 shown in FIG. 1.

FIG. 3 is a block diagram that shows a basic configuration of the controller 5 shown in FIG. 1.

In FIG. 3, the controller 5 is configured with a first voltage control system 101, a second voltage control system 102 and a current control system 103. The current control system 103 is located on a latter part of the first voltage control system 101 and the second voltage control system 102 (i.e., the current control system 103 is downstream of the others). Therefore, an output value that is output from the first voltage control system 101 and an output value that is output from the second voltage control system 102 are input to the current control system 103.

In the first voltage control system 101, a dead zone 12 (a dead zone circuit) is provided at the latter part of a subtracter 11. A CV controller 13 is provided at the latter part of the dead zone 12. A limiter 14 is provided at the latter part of the CV controller 13. The CV controller 13 compares the voltage V1 with V1_ref that is a target value of the voltage V1. Then, the CV controller 13 generates a control input of the current I based on the compared result and outputs the control input. The dead zone 12 can configure an acceptable range for change of the voltage V1. Thus, the dead zone 12 is provided so that the CV controller 13 does not operate as long as the change of the voltage V1 is within the acceptable range. The limiter 14 is provided in order to limit the range of the control input that is output from the CV controller 13. In the case in which the control input, which is output from the CV controller 13, is within the range that is configured by the limiter 14, the control input, which is output from the CV controller 13, is output as it is from the first voltage control system 101. On the other hand, in the case in which the control input, which is output from the CV controller 13, is out of the range that is configured by the limiter 14, a lower limit or an upper limit, which is configured by the limiter 14, is output from the first voltage control system 101 instead.

In the second voltage control system 102, a CV controller 23 is provided at the latter part of a subtracter 21. A limiter 24 is provided at the latter part of the CV controller 23. The CV controller 23 compares the voltage V2 with V2_ref that is a target value of the voltage V2. The CV controller 23 generates a control input of the current I based on the compared result and outputs the control input. The limiter 24 is provided in order to limit the range of the control input that is output from the CV controller 23. In the case in which the control input, which is output from the CV controller 23, is within the range that is configured by the limiter 24, the control input, which is output from the CV controller 23, is output as it is from the second voltage control system 102. On the other hand, in the case in which the control input, which is output from the CV controller 23, is out of the range that is configured by the limiter 24, a lower limit or an upper limit, which is configured by the limiter 24, is output from the second voltage control system 102.

In the current control system 103, an adder-subtracter 32 is provided at the latter part of an adder 31 and a CC controller 33 is provided at the latter part of the adder-subtracter 32. In addition, a limiter 34 is provided at the latter part of the CC controller 33. The CC controller 33 compares a value, which is the sum of the control input that is output from the first voltage control system 101 and the control input that is output from the second voltage control system 102, with the current I. Further, the CC controller 33 generates a command value of a duty ratio for Pulse Width Modulation (PWM) control based on the compared result and outputs the command value. The limiter 34 is provided in order to limit the range of the command value that is output from the CC controller 33. In the case in which the command value, which is output from the CC controller 33, is within the range that is configured by the limiter 24, the command value, which is output from the CC controller 33, is output as it is from the current control system 103. On the other hand, in the case in which the command value, which is output from the CC controller 33, is out of the range that is configured by the limiter 34, a lower limit or an upper limit, which is configured by the limiter 34, is output from the current control system 103. In the case of Pulse Frequency Modulation (PFM) control, the CC controller 33 generates the command value of a frequency for the PFM control. In addition, a value of a control parameter for the CC controller 33 can be configured in common for both power conversion from the primary side to the secondary side of the transformer 3 and for power conversion from the secondary side to the primary side of the transformer 3.

For power conversion from the primary side to the secondary side of the transformer 3, the values of the limiters 14, 24, 34 are configured as follows:

Limiter 14: the lower limit=−ΔI, the upper limit=ΔI;
Limiter 24: the lower limit=0, the upper limit=I_ref; and
Limiter 34: the lower limit=0, the upper limit=the greatest duty ratio.

Here, I_ref is a target value of the current I that is output from the input and output terminals of the current-source power converter 2. ΔI can be configured as a predetermined value. In the case in which the ranges of the limiters 14, 24, 34 are configured as explained above, the outputs of the first voltage control system 101, the second voltage control system 102 and the current control system 103 are limited as follows. In the case in which the control input, which is output from the CV controller 13, is larger than ΔI, the control input, which is output from the first voltage control system 101, is ΔI. In the case in which the control input, which is output from the CV controller 13, is smaller than −ΔI, the control input, which is output from the first voltage control system 101, is −ΔI. In the case in which the control input, which is output from the CV controller 23, is larger than I_ref, the control input, which is output from the second voltage control system 102, is I_ref. In the case in which the control input, which is output from the CV controller 23, is smaller 0, the control input, which is output from the second voltage control system 102, is 0. In the case in which the command value, which is output from the CC controller 33, is larger than a value of the greatest duty ratio, the command value, which is output from the current control system 103, is the same as the value of the greatest duty ratio. In the case in which the command value, which is output from the CC controller 33, is smaller than 0, the command value, which is output from the current control system 103, is 0. Therefore, the greatest value, that is the sum of the control input that is output from the first voltage control system 101 and of the control input that is output from the second voltage control system 102, becomes I_ref+ΔI. The minimum value becomes −ΔI. As a result, the current I changes between I_ref+ΔI and −ΔI.

Further, for power conversion from the secondary side to the primary side of the transformer 3, the values of the limiters 14, 24, 34 are configured as follows:
Limiter 14: the lower limit=−I_ref, the upper limit=0;
Limiter 24: the lower limit=0, the upper limit=0; and
Limiter 34: the lower limit=0, the upper limit=the greatest duty ratio.

Here, for power conversion from the secondary side to the primary side of the transformer 3, the increase and the decrease of the current which flows into the input and output terminals of the current-source power converter 2 are controlled. A target value of the current I is a negative value.

In this embodiment, the control input, which is output from the first voltage control system 101, is limited to the range between −I_ref and 0. That is, the first control voltage system 101 outputs the control input that varies as follows. This control input corresponds to the current flowing into the current-source power converter 2 varies in the range between 0 to I_ref. Further, because the lower limit and the upper limit of the limiter 24 are configured to 0, the control input, which is output from the second voltage control system 102, is maintained at 0. Thus, the function of the second voltage control system 102 can be substantially stopped by the setting value of the limiter 24. Further, the current control system 103 compares the control value that is output from the first voltage control system 101 and the current I. Then, the current control system 103 generates the command value of the duty ratio based on the compared result.

Operations in which the limiters 14, 24, 34 are established as discussed above are explained. First of all, the power conversion from the secondary side to the primary side of the transformer 3 is explained. For power conversion from the secondary side to the primary side of the transformer 3, the acceptable range of change of the dead zone 12 is configured to 0. The subtracter 11 outputs a value that is calculated by subtracting the voltage V1, which is a detected voltage at the input and output terminals of the voltage-source power converter 4, from the target value V1_ref. Then, the subtracted value is input to the CV controller 13 through the dead zone 12. The CV controller 13 generates a control input in which the subtracted value appears to approach 0 (the control input in which the voltage V1 approaches the target value V1_ref). After this control input is limited to the range between −I_ref and 0 at the limiter 14, the control input is output from the first voltage control system 101. Then, the control input is output to the adder-subtracter 32 through the adder 31.

The control input, which is output from the first voltage control system 101, is input to the adder-subtracter 32 through the adder 31. The adder-subtracter 32 adds an output value of the adder 31 and I-ref that is a target value of a charged current. Then, the adder-subtracter 32 subtracts the detection value of the current I from the added value. The calculated value is input to the CC controller 33. The CC controller 33 generates the command value the control input in which the calculated value approaches 0. After the limiter 34 limits the command value to the range between 0 to the greatest duty ratio, the limiter 34 outputs a duty ratio as a duty command Duty.

Next, the power conversion from the primary side to the secondary side of the transformer 3 is explained. For power conversion from the primary side to secondary side of the transformer 3, the control inputs are output from both the first voltage control system 101 and the second voltage control system 102 according to the configuration of the limiters 14, 24. The control input, which is output from the first voltage control system 101, is configured so as to be either positive or negative values.

The acceptable range of change of the dead zone 12 of the first voltage control system 101 is configured to the any value over 0. The subtracter 11 subtracts the voltage V1 from the target value V1_ref. The subtracted value is input to the CV controller 13 through the dead zone 12.

The CV controller 13 generates the control input in which the input subtracted value appears to approach 0 (the control input in which the detection value of the voltage V1 approaches the target value V1_ref of the rail voltage). The limiter 14 limits the control input to be in the range between −ΔI and ΔI. The control input, which is output from the limiter 14, is input to the adder 31.

The subtracter 21 subtracts the voltage V2, which is a detection voltage of the input and output terminals of the current-source power converter 2, from the target value V2_ref. The subtracted value is input to the CV controller 23.

The CV controller 23 generates the control input in which the input subtracted value appears to approach 0 (the control input in which the voltage V2 approaches the target value V2_ref). The limiter 24 limits the control input to be in the range between 0 and I_ref. The control input, which is output from the limiter 14, is input to the adder 31.

The adder 31 adds the output values from the limiters 14 and 24. The added value is input to the adder-subtracter 32. The adder-subtracter 32 adds the output value of the adder 31 and the target value I_ref. Then, adder-subtracter 32 subtracts the current I, that is the detection value of the electric current which is output from the input and output terminals of the current-source power converter 2, from the added value. The calculated value is input to the CC controller 33. The CC controller 33 generates the command value so as to make the output value of the adder-subtracter 32 approaches to 0. After the limiter 34 limits the command value to the range between 0 to the greatest duty ratio, the limiter 34 outputs a duty ratio as the duty command Duty.

Next, gate driving signals S1, S2, Sa-Sd that are generated based on the duty command Duty are explained. The switching elements Q1, Q2 shown in FIG. 2 are driven by the gate driving signals S1, S2. The switching elements Qa-Qd shown in FIG. 2 are driven by the gate driving signals Sa-Sd.

Figure 4:
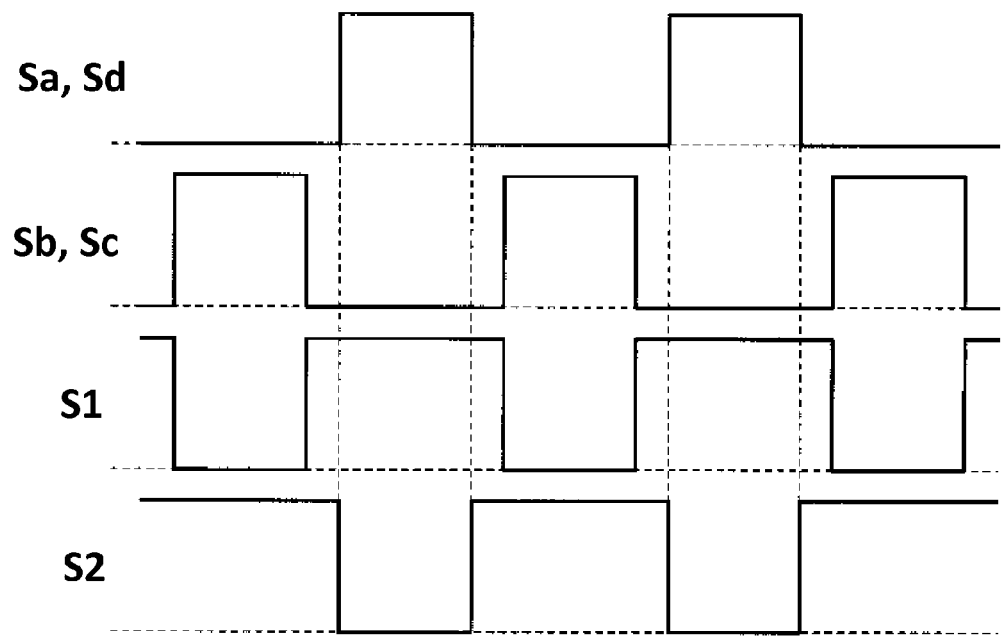
FIG. 4 is a timing diagram that shows waveforms of gate driving signals S1, S2, Sa-Sd shown in FIG. 1.

FIG. 4 is a timing diagram that shows the waveforms of the gate driving signals S1, S2, Sa-Sd shown in FIG. 1. The duty ratios of the gate driving signals Sa-Sd are configured based on the duty command Duty. Further, the duty ratios of the gate driving signals Sa-Sd are configured so as to be the same one another. Phases of the gate driving signals Sa, Sd and phases of the gate driving signal Sb, Sc are different from each other by only a half cycle.

The gate driving signal S1 is generated by inverting the gate driving signals Sb, Sc. The gate driving signal S2 is generated by inverting the gate driving signals Sa, Sd. Thus, all of the gate driving signals S1, S2, Sa-Sd can be generated based on the duty command Duty.

For power conversion from the primary side to the secondary side of the transformer 3, the second voltage control system 102 shown in FIG. 3 performs to increase the voltage V2 when the voltage V2 decreases. Similarly, the first voltage control system 101 performs to increase the voltage V1 when the voltage V1 decreases. The operations of the first voltage control system 101 and the second voltage control system 102 are performed in parallel.

Thus, as the operations of first voltage control system 101 and the second voltage control system 102 are performed in parallel, the change of the voltage V1 can be controlled when the power conversion is performed from the primary side to the secondary side of the transformer 3. For instance, when the voltage V2 decreases due to the decrease of the voltage V1, it is possible to increase the voltage V1 while the increase of the voltage V2 is prevented.

Figure 17:
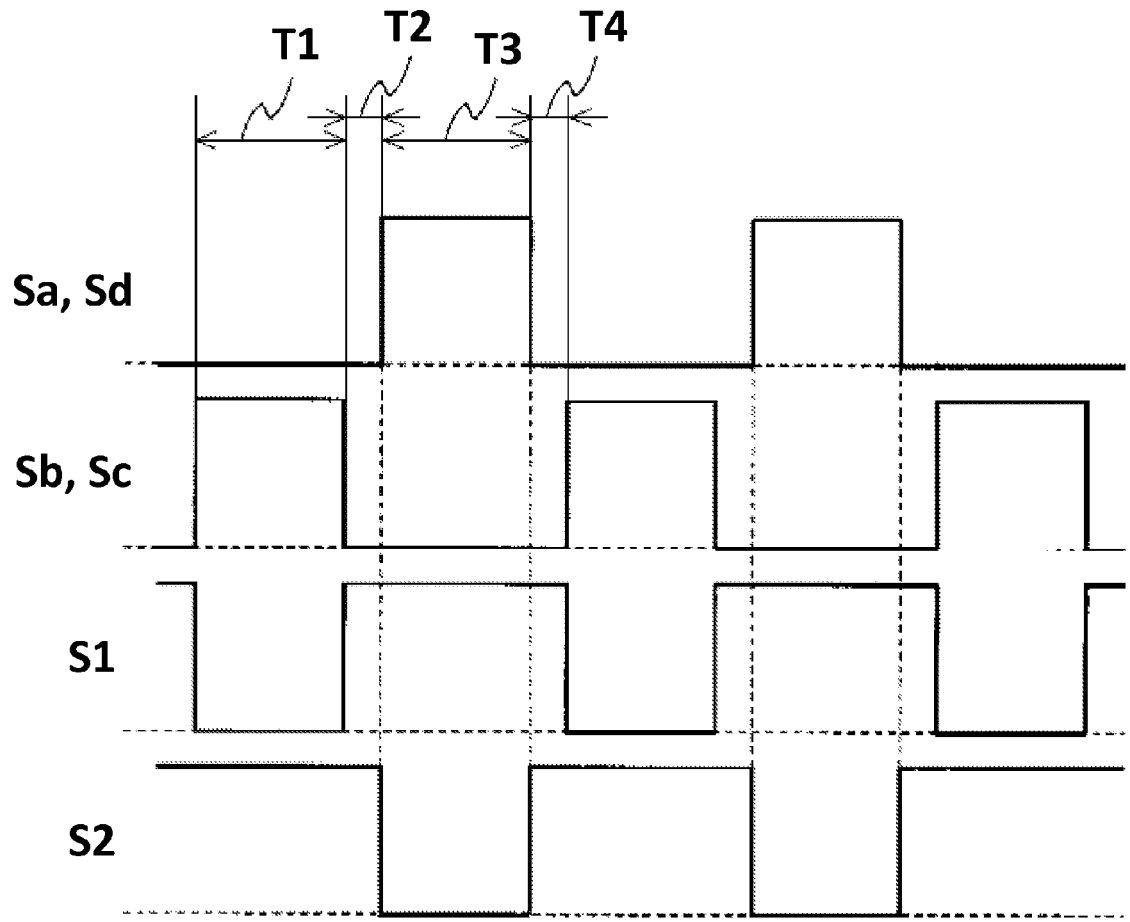
FIG. 17 is a timing diagram showing periods from T1 to T4 on the timing chart that shows waveforms of the gate driving signals S1, S2, Sa-Sd shown in FIG. 4.

A method for controlling a current value is explained in detail based on FIG. 2 and FIG. 17. FIG. 17 is a timing diagram showing periods from T1 to T4 on the timing chart that shows waveforms of the gate driving signals S1, S2, Sa-Sd shown in FIG. 4.

It is explained about the case in which both the switching elements Q1, Q2 turn ON. During the periods of T2, T4 in FIG. 17, the switching elements Q1, Q2 turn ON. When the switching elements Q1, Q2 turn ON, the switching elements Qa-Qd turn OFF. Therefore, both ends of the primary winding of the transformer 3 keep open. That is, the voltage V1 is not applied to both ends of the primary winding of the transformer 3.

On the other hand, by turning ON the switching elements Q1, Q2, an electric current that flows from the center tap of the secondary winding of the transformer 3 to the switching element Q1 and an electric current that flows from the center tap of the secondary winding of the transformer 3 to the switching element Q2 flow to the two secondary windings. At this time, a voltage is not generated at the secondary side of the transformer 3 because both ends of the secondary winding of the transformer 3 become short.

Therefore, the relationship of the input voltage V2 and the current I are defined as formula 1 (a direction of the arrow shown in FIG. 2 is positive). Here, the inductance of the inductor L is L in the formula.

$$V2 + L \times dI/dt = 0 \quad \text{(Formula 1)}$$

An electric current during this period changes according to a change ratio (dI/dt) that satisfies formula 1. Therefore, during this period, as long as the electric current flows in the direction as indicated by the arrow shown in FIG. 2, the electric current decreases by the change ratio (dI/dt) that satisfies formula 1. On the other hand, as long as the electric current flows in a direction opposite to the arrow shown in FIG. 2, the electric current increases by the change ratio (dI/dt) that satisfies formula 1.

Next, it is explained about the case in which only one of either the switching elements Q1 or Q2 turns ON. During the period of T1 shown in FIG. 17, the switching elements Q2, Qb and Qc turn ON. During the period of T3 shown in FIG. 17, the switching elements Q1, Qa and Qd turn ON. When the switching elements Qb, Qc turn ON or when the switching elements Qa, Qd turn ON, the voltage V1 is applied to both ends of the primary winding of the transformer 3.

However, an electric pole of the applied voltage V1 in the case in which the switching element Qb, Qc turn ON and an electric pole of the applied voltage V1 in the case in which the switching element Qa, Qd turn ON are opposite to each other. When the winding number ratios of the primary side and the secondary side of the transformer 3 are n1:n2, a voltage generated at the secondary side of the transformer 3 during the periods of T1, T3 becomes V1×(n2/n1). Therefore, during the periods of T1, T3, formula 2 below is satisfied.

$$V2 + L \times dI/dt = V1 \times (n2/n1) \quad \text{(Formula 2)}$$

The electric current during this period changes by the change ratio (dI/dt) that satisfies formula 2. Therefore, during this period, as long as the electric current flows in the direction indicated by the arrow shown in FIG. 2, the electric current increases by the change ratio (dI/dt) that satisfies formula 2. On the other hand, as long as the electric current flows in a direction opposite to the arrow shown in FIG. 2, the electric current decreases by the change ratio (dI/dt) that satisfies formula 2.

Formula 1 and formula 2 are satisfied both when the electric power is transmitted from the primary side to the secondary side and when the electric power is transmitted from the secondary side to the primary side. When it is desired to decrease a voltage of the secondary side or to increase a voltage of the primary side, the periods of T2, T4, that is, the time when both the switching element Q1 and the switching element Q2 turn ON (the time when all of the switching elements Qa-Qd turn OFF), should be longer.

In contrast, when it is desired to increase a voltage of the secondary side or to decrease a voltage of the primary side, the periods of T1, T3, that is, the time when either the switching element Q1 or the switching element Q2 turns ON (the time when the switching elements Qb, Qc turn ON, or the time when the switching elements Qa, Qd turn ON), should be longer.

A direction in which the current I flows is determined based on the relationship between V2 and V1×(n2/n1), that is, a voltage difference, and based on the relationship of the periods of T2, T4 and the periods of T1, T3, that is, the ratio of both periods=T1:T2 and T3:T4.

In the present invention, the voltages V1 and V2 can be adjusted by the same control regardless of the direction in which the current I flows. Therefore, switching from the powering state to the regeneration state or switching from the regeneration state to the powering state can be easily performed.

Figure 5:
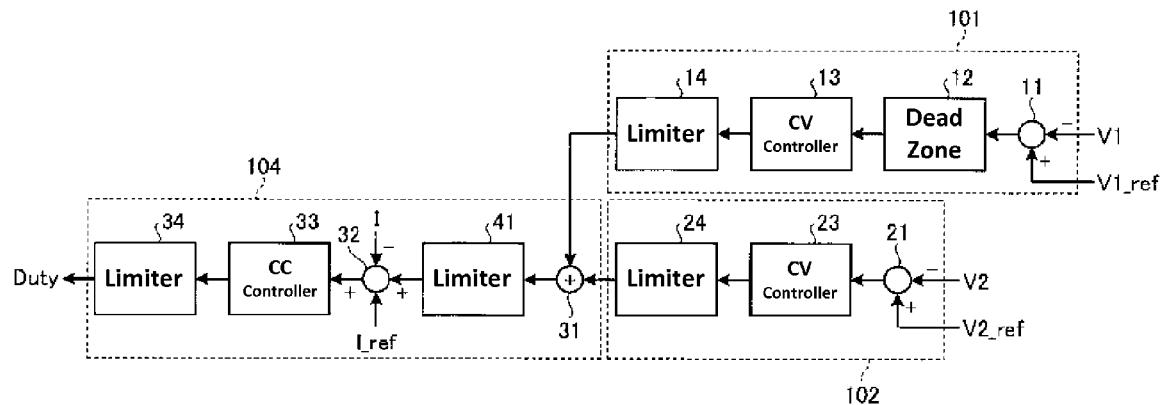
FIG. 5 is a block diagram of a controller that is applied to a DC-DC converter according to a second embodiment of the present invention.

FIG. 5 is a block diagram that shows a basic configuration of a control system that is applied to a DC-DC converter according to a second embodiment of the present invention.

In FIG. 5, a current control system 104 is provided instead of the current control system 103 shown in FIG. 3. A limiter 41 is provided at a former part of the adder-subtracter 32 in the current control system 104 (i.e., the limiter 41 is upstream of the adder-subtracter 32).

For power conversion from the primary side to the secondary side of the transformer 3, the values of the limiter 41 are configured as follows:
Limiter 41: the lower limit=0, the upper limit=I_ref. Here, the positive value shows a current value that is output from the input and output terminals of the current-source power converter 2. The negative value shows the current value that flows into the input and output terminals of the current-source power converter 2.

For power conversion from the secondary side to the primary side of the transformer 3, the values of the limiter 41 is configured as follows:

Limiter 41: the lower limit=−I_ref, the upper limit=0 Here, by providing the limiter 41 at the former part of the adder-subtracter 32, an output value of the adder 31 can be limited to the range between 0 and I_ref. That is, the sum of the control input that results from the operation of the first voltage control system 101 and the control input that results from the operation of the second voltage control system 102 is limited to the range between 0 and I_ref.

Figure 6:
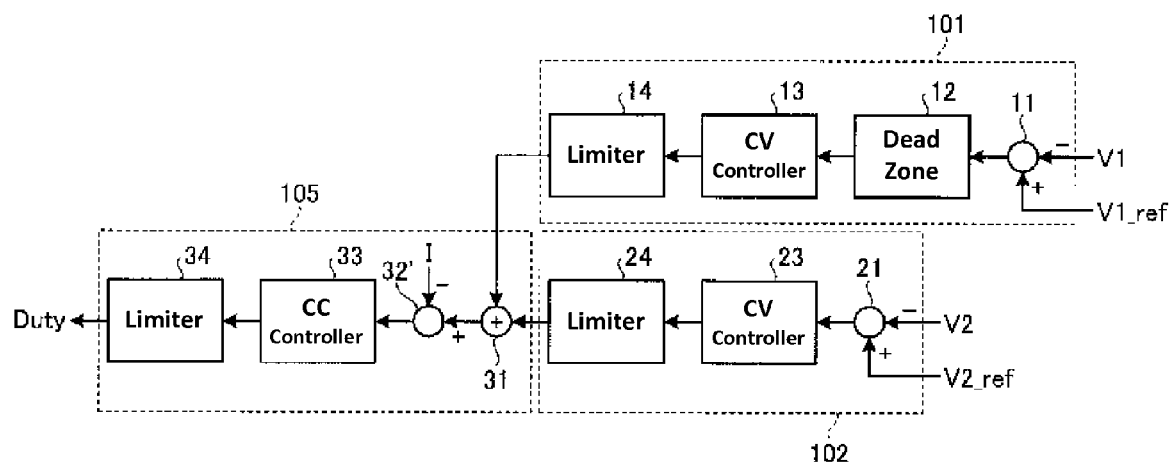
FIG. 6 is a block diagram of a controller that is applied to a DC-DC converter according to a third embodiment of the present invention.

FIG. 6 is a block diagram that shows a basic configuration of a control system that is applied to a DC-DC converter according to a third embodiment of the present invention.

In FIG. 6, a current control system 105 is provided instead of the current control system 103 shown in FIG. 3. In the current control system 105, a subtracter 32' is provided instead of the adder-subtracter 32. In the subtracter 32', the input of the target value I_ref is omitted and the detection value of the current I is subtracted from the output value of the adder 31.

In this control system, for power conversion from the primary side to the secondary side of the transformer 3, the values of the limiters 14, 24, 34 are configured as follows:
Limiter 14: the lower limit=−ΔI, the upper limit=ΔI;
Limiter 24: the lower limit=0, the upper limit=I_ref; and
Limiter 34: the lower limit=0, the upper limit=the greatest duty ratio.

Here, a positive value shows a current value which is output from the input and output terminals of the current-source power converter 2. A negative value shows the current value that flows into the input and output terminals of the current-source power converter 2. In this case, the range of the current I is between −ΔI and I_ref+ΔI. In the range between 0 and I_ref+ΔI, the current I becomes the electric current that is output from the input and output terminals of the current-source power converter 2. In the range between −ΔI and 0, the current I becomes the electric current that flows into the input and output terminals of the current-source power converter 2.

Further, for power conversion from the secondary side to the primary side of the transformer 3, the output values of the limiters 14, 24, 34 can be configured as follows:
Limiter 14: the lower limit=−I_ref, the upper limit=0;
Limiter 24: the lower limit=0, the upper limit=0; and
Limiter 34: the lower limit=0, the upper limit=the greatest duty ratio.

Here, in this case, the range of the current I is between −I_ref and 0. The current I becomes the electric current that flows into the input and output terminals of the current-source power converter 2.

Figure 7:
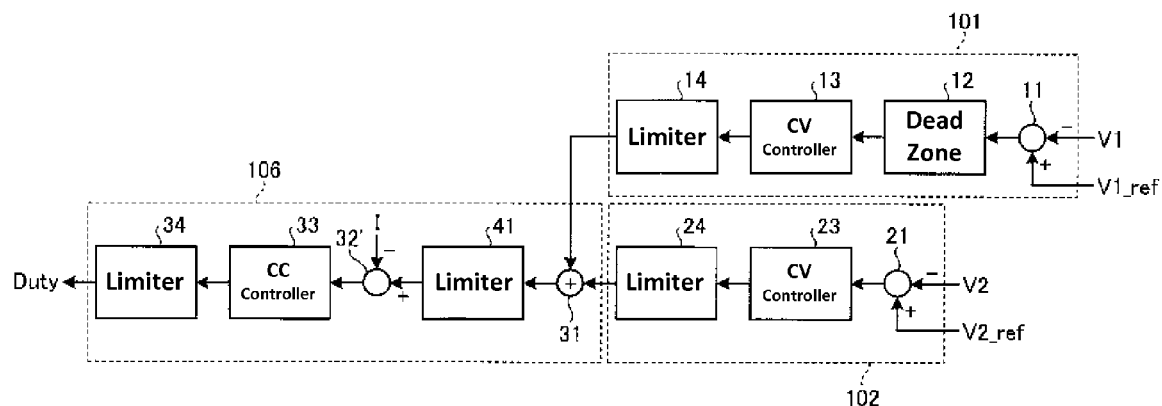
FIG. 7 is a block diagram of a controller that is applied to a DC-DC converter according to a fourth embodiment of the present invention.

FIG. 7 is a block diagram that shows a basic configuration of a control system which is applied to a DC-DC converter according to a fourth embodiment of the present invention.

In FIG. 7, a current control system 106 is provided instead of the current control system 105 shown in FIG. 6. In the current control system 106, a limiter 41 is provided on the former part of the subtracter 32' shown in the current control system 105.

For power conversion from the primary side to the secondary side of the transformer 3, the values of the limiters 14, 24, 34, 41 are configured as follows:
Limiter 14: the lower limit=−ΔI, the upper limit=ΔI;
Limiter 24: the lower limit=0, the upper limit=I_ref;
Limiter 34: the lower limit=0, the upper limit=the greatest duty ratio; and
Limiter 41: the lower limit=0, the upper limit=I_ref. Here, in this case, the sum of the control input that results from the operation of the first voltage control system 101 and the control input that results from the operation of the second voltage control system 102 is limited to the range between 0 and I_ref.

Further, for power conversion from the secondary side to the primary side of the transformer 3, the output values of the limiters 14, 24, 34, 41 can be configured as follows:
Limiter 14: the minimum value=−I_ref, the greatest value=0;
Limiter 24: the minimum value=0, the greatest value=0;
Limiter 34: the minimum value=0, the greatest value=the greatest duty ratio; and
Limiter 41: the minimum value=−I_ref, the greatest value=0.

Here, in this case, the range of the current I is between −I_ref and 0. The current I becomes the electric current which flows into the input and output terminals of the current-source power converter 2.

Figure 8:
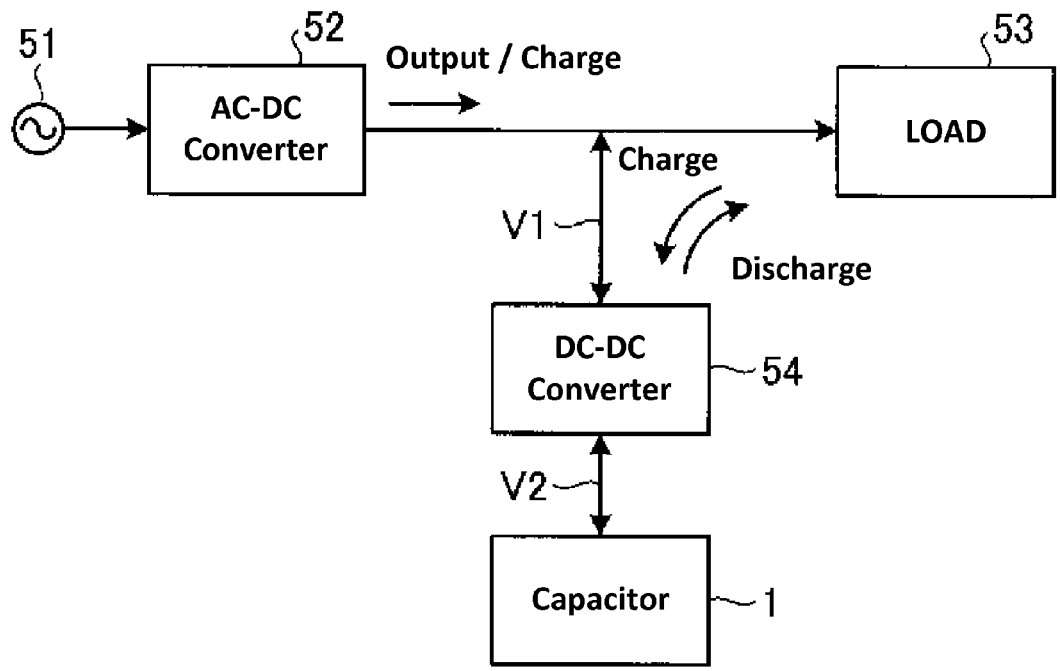
FIG. 8 is a block diagram of a power supply system in which a DC-DC converter shown in FIG. 1 is applied.

FIG. 8 is a block diagram of a power supply system in which a DC-DC converter shown in FIG. 1 is applied.

A load 53 is connected to an AC power source 51 through an AC-DC converter 52 as shown in FIG. 8. The load 53 can be, for example, electronic equipment that is operated by a direct current or a direct current motor. Further, the load 53 can be a solar battery or a power generator.

A capacitor (storage battery) 1 is connected to the load 53 through a DC-DC converter 54.

An alternating current that is output from the AC power source 51 is converted to a direct current by the AC-DC converter 52. The converted direct current is provided to the load 53.

Further, in case of accumulating the energy that is generated in the load 53 into the capacitor 1, the voltage V1 is converted to the voltage V2 by the DC-DC converter 54. Then, the capacitor 1 is charged by the voltage V2. On the other hand, in the case in which the AC power source 51 is blocked, the voltage V2 is converted to the voltage V1 by the DC-DC converter 54. Then, the converted electric power is provided to the load 53.

By using the configuration of the DC-DC converter shown in FIG. 1 as the DC-DC converter 54, the change of the voltage V1 can be controlled/prevented while charging. For example, when the voltage V2 decreases due to the decrease of the voltage V1, it is possible to increase the rail voltage V1 while the increase of the voltage V2 is prevented.

Figure 9:
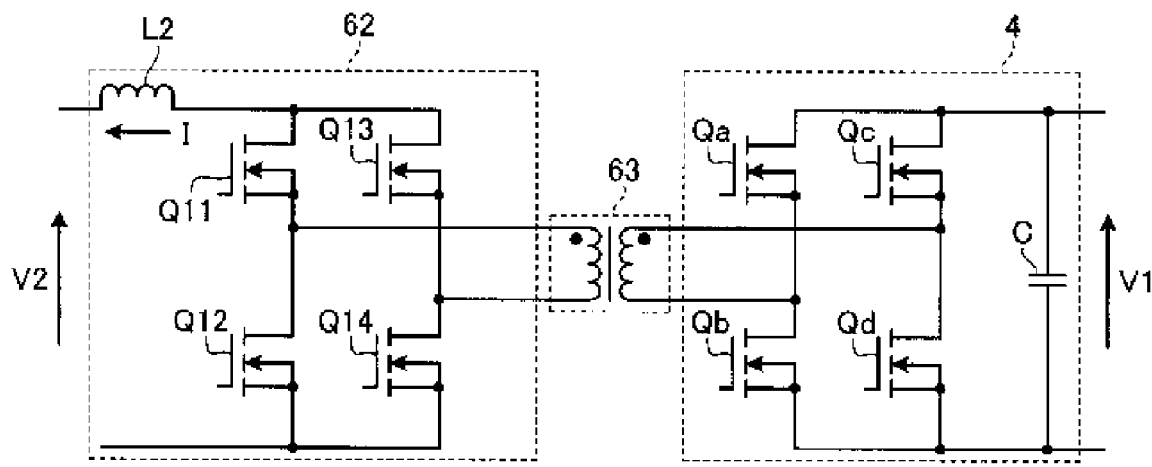
FIG. 9 is a circuit diagram of a current-source power converter 62 and a voltage-source power converter 4 that are applied to a DC-DC converter according to a fifth embodiment of the present invention.

FIG. 9 is a circuit diagram that shows a basic configuration of a current-style power converter 62 and the voltage-source power converter 4 that are applied to a DC-DC converter according to a fifth embodiment of the present invention. Further, a full bridge configuration is used as an example for the current-source power converter 62 in the embodiment shown in FIG. 9.

In FIG. 9, the current-source power converter 62 and the transformer 63 are provided instead of the current-source power converter 2 and the transformer 3 shown in FIG. 1. However, the other configurations are the same as the configurations shown in FIG. 1.

The current-source power converter 62 is configured with switching elements Q11-Q14 and an inductor L2. The switching elements Q11, Q12 are connected in series with each other and the switching elements Q13, Q14 are connected in series with each other. The series circuit of the switching elements Q11 and Q12 and the series circuit of the switching elements Q13 and Q14 are connected in parallel each other. A secondary winding of the transformer 63 is connected between a node connecting of the switching elements Q11 and Q12 and a node connecting of the switching elements Q13 and Q14. Further, the inductor L2 is connected to the node connecting of the switching elements Q11 and Q13.

Further, as the switching elements Q11-Q14, a field effect transistor, a bipolar transistor or an IGBT can be used. Further, in the switching elements Q11-Q14, a body diode can also be formed.

In the DC-DC converter, gates of the switching elements Q12, Q13 are driven by the gate driving signal S1 shown in FIG. 4 and gates of the switching elements Q11, Q14 are driven by the gate driving signal S2 shown in the FIG. 4. The other operations are the same as the operations of the DC-DC converter shown in FIG. 1.

Further, when the voltage V2 is low or when the range of change of the voltage V1 is narrow, it is efficient for the current-source power converter 2 that has the push-pull configuration shown in FIG. 2. In this current-source power converter 2 shown in FIG. 2, the current configuration can be simplified as compared with the current-source power converter 62 of the full-bridge configuration shown in FIG. 9.

On the other hand, when the voltage V2 is high or when the range of change of the voltage V1 is wide, the current-source power converter 62 that has the full bridge configuration shown in FIG. 9 is preferred because voltage stresses of the switching elements Q1, Q2 become large.

In the present embodiment, an input-output current of the input and output terminals of the current-source power converter 2 is detected. A controlled variable (control input) corresponding to the detected electric current is generated for controlling. However, the control can also be performed by detecting an input-output electric current of the input and output terminals of the voltage-source power converter 4 and by generating the controlled variable corresponding to the detected electric current. Further, it is possible that when the electric current is output from the input and output terminals of the current-source power converter 2, the control is performed by generating the controlled variable corresponding to the detected electric current by detecting the input-output electric current of the input and output terminals of the current-source power converter 2. It is also possible that when the electric current is output from the input and output terminals of the voltage-source power converter 4, the control is performed by generating the controlled variable corresponding to the detected electric current by detecting the input-output electric current of the input and output terminals of the voltage-source power converter 4.

Figure 10:
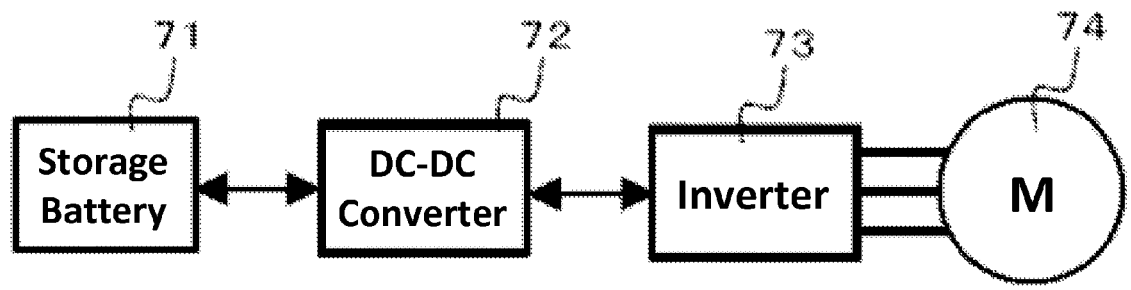
FIG. 10 is a block diagram of a DC-DC converter that is applied to a drive device for an electric motor.

Further, as a DC-DC converter 72 shown in FIG. 10, the DC-DC converter shown in FIG. 1 can be used by being provided between an inverter 73 that drives an electric motor 74 and a storage battery 71 so as to connect the inverter 73 with the storage battery 71. In this configuration, a powering operation that drives the electric motor 74 by electric power from the storage battery 71 is performed. Similarly, a regeneration operation that regenerates energy for the storage battery from the electric motor 74 is also performed.

In the DC-DC converter 72, input and output terminals of a voltage-source power converter are connected to the storage battery 71. Input and output terminals of a voltage-source power converter are connected to the inverter 73. In the powering operation, the operations of the voltage-source power converter and the current-source power converter are controlled as explained below. A voltage between the input and output terminals that connect to the inverter 73 of the DC-DC converter 72 is maintained at a predetermined voltage value. Further, an electric current that flows out from the storage battery 71 is controlled so as to not exceed a predetermined current value. In the regenerating operation, the operations of the voltage-source power converter and the current-source power converter are controlled as explained below. A voltage between the input and output terminals that connect to the inverter 73 of the DC-DC converter 72 is maintained at a predetermined voltage value. Further, an electric current that flows into the storage battery 71 is controlled so as to not exceed a predetermined current value.

The above described control is realized by setting the control units shown in FIG. 6 as follows:
Limiter 14: the lower limit=−I2, the upper limit=I1;
Limiter 24: the lower limit=0, the upper limit=0; and
Limiter 34: the lower limit=0, the upper limit=the greatest duty ratio.

Here, an acceptable range of change of the dead zone 12 of the first voltage control system 101 is configured to 0.

In the above described configuration, when the powering operation is performed, a current value that flows into the storage battery 71 is acceptable up to a current value I1. On the other hand, when the regenerating operation is performed, a current value that flows out from the storage battery 71 is acceptable up to a current value I2. Therefore, a charge current (an electric current that flows into the storage battery 71) changes between 0 and I1. A discharge current (an electric current that flows out from the storage battery 71) changes between 0 and I2. The current values I1 and I2 are configured based on the rating of the storage battery 71. That is, the current value I1 is configured within a range that does not exceed the greatest charge current of the storage battery 71. The current value I2 is configured within a range that does not exceed the greatest output (discharge) current.

Figure 11:
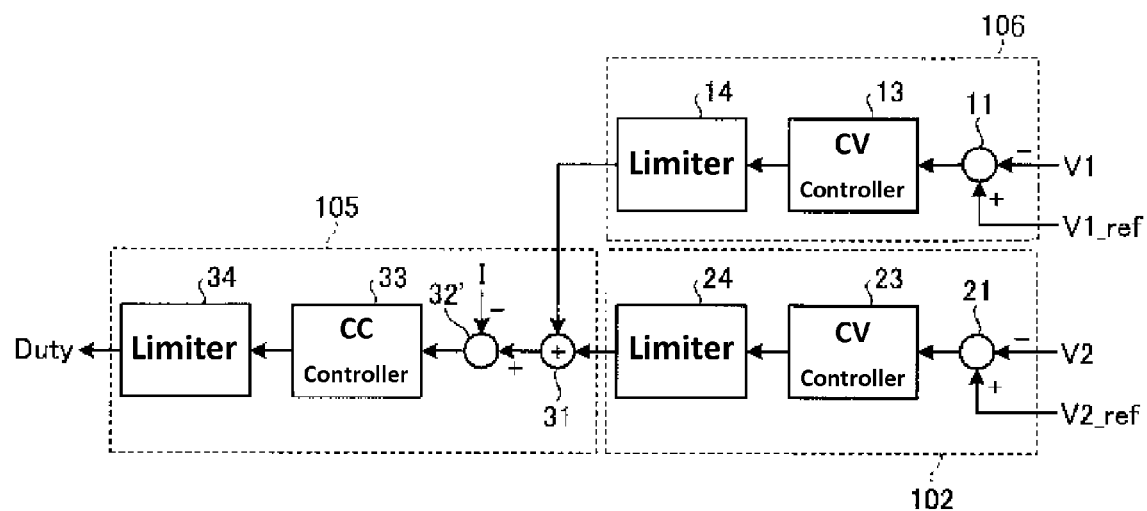
FIG. 11 is a block diagram of a DC-DC converter in which a dead zone is omitted from a controller according to a third embodiment of the present invention.

Further, when an acceptable range of change of the dead zone 12 of the first voltage control system 101 is configured to 0, it is substantially the same as the following situation. The dead zone 12 is omitted from the first voltage control system 101 shown in FIG. 6. In other words, as shown in FIG. 11, the above described situation is the same as a case in which the voltage control system 101 is changed to a first voltage control system 107 that does not have the dead zone 12.

In the DC-DC converter 72 according to the present embodiment, a configuration is explained wherein the storage battery 71 is connected to the input and output terminals of the current-source power converter and the inverter 73 is connected to the input and output terminals of the voltage-source power converter. The present embodiment is not limited to this configuration. A configuration in which the inverter 73 is connected to the input and output terminals of the current-source power converter and the storage battery 71 is connected to the input and output terminals of the voltage-source power converter is also feasible.

Next, an operation setting process of a DC-DC converter according to the present invention is explained. As described above, the controller 5 of the DC-DC converter according to certain aspects of the present invention is configured with a first voltage control system (calculation unit), a second voltage control system (calculation unit) and a current control system (calculation unit). The first voltage control system generates (calculates) a first control input based on the voltage V1 of the input and output terminals of the voltage-source power converter 4. The second voltage control system generates (calculates) a second control input based on the voltage V2 of the input and output terminals of the current-source power converter 2. The current control system generates (calculates) a third control input based on the current I that is input to and output from the input and output terminals of the current-source power converter 2. Further, the DC-DC converter is operated in various operation modes according to the parameter settings of the first voltage control system, the second voltage control system and the current control system. The parameters set by the operation setting process of the DC-DC converter include a limiter setting value, a dead zone setting value and a dead time setting value of a driving signal.

Figure 12:
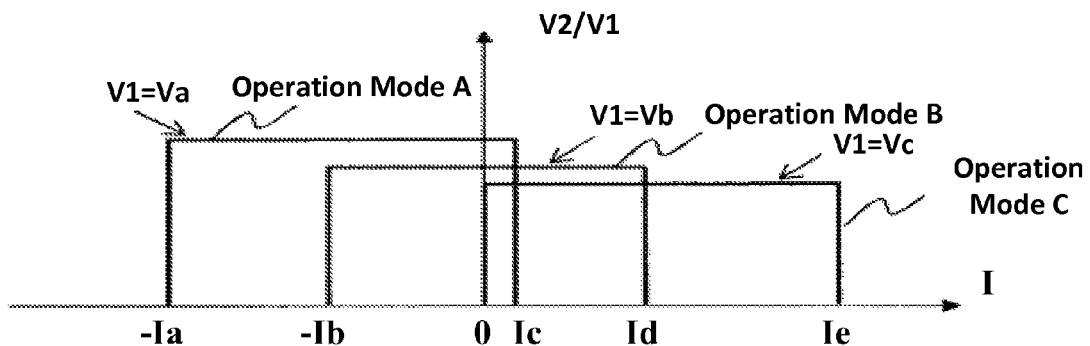
FIG. 12 is a graph showing a relationship between a current I that is input to and output from input and output terminals of a current-source power converter 2 and a voltage V1 of input and output terminals of a voltage-source power converter 4 or a voltage V2 of the input and output terminals of the current-source power converter 2.

FIG. 12 shows an embodiment of the operation modes. As an operation mode A, when the current I flowing in the input and output terminals of the current-source power converter 2 reaches Ia or when the current I that is output from the input and output terminals of the current-source power converter 2 reaches Ic, a constant current operation is performed. Then, when the current I is in the range between Ia and Ic described above, a constant voltage operation is performed so that the voltage V1 is maintained as a voltage value Va. As an operation mode B, when the current I flowing in the input and output terminals of the current-source power converter 2 reaches Ib or when the current I that is output from the input and output terminals of the current-source power converter 2 reaches Id, the constant current operation is performed. Then, when the current I is in a range between Ib and Id described above, the constant voltage operation is performed so that the voltage V1 is maintained as a voltage value Vb. As an operation mode C, when the current I that is output from the input and output terminals of the current-source power converter 2 reaches Ie, the constant current operation is performed. Then, when the current I is in a range between 0 and Ie described above, the constant voltage operation is performed so that the voltage V1 is maintained as a voltage value Vc.

Figure 18:
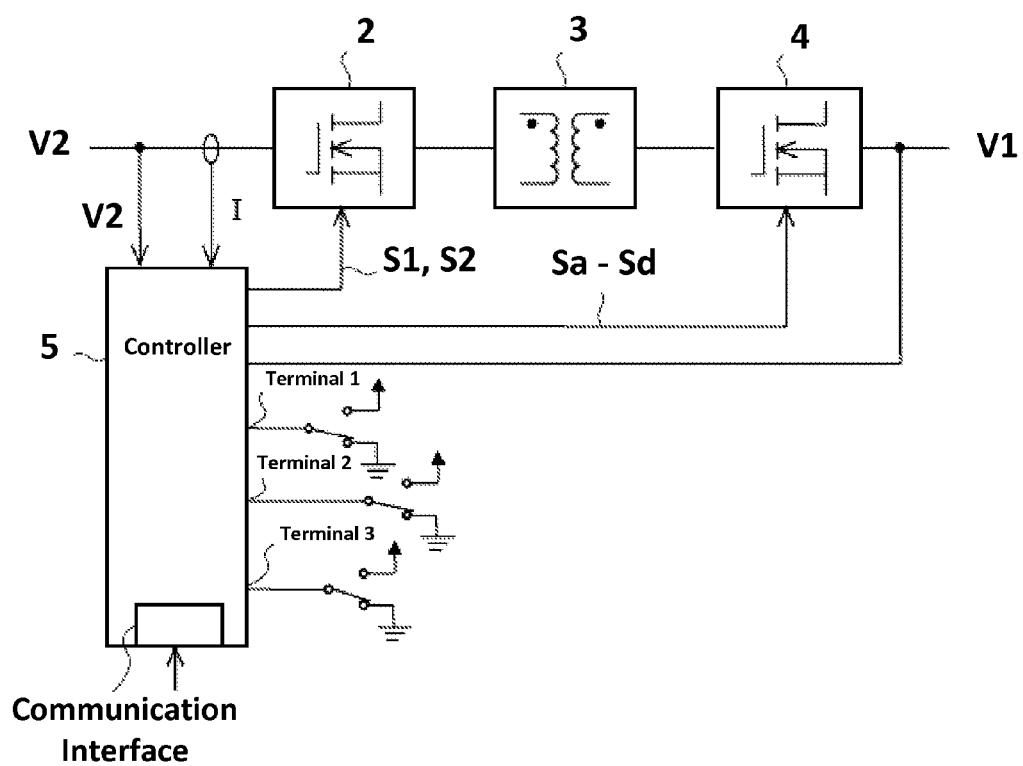
FIG. 18 is a block diagram of a DC-DC converter in which the controller shown in FIG. 1 additionally includes terminals that are for selecting parameter sets and a communication interface.

The controller 5 is configured with, for example, a DSP (Digital Signal Processor). The DSP is provided with a nonvolatile memory element, an A/D converter and an interface that outputs a PWM pulse. The nonvolatile memory element stores a program for operating the DSP. The A/D converter is used so as to convert the detected values of the voltage V1, voltage V2 and the current I to digital values. The interface outputs the PWM pulse as a signal to drive switching elements that configures the current-source power converter 2 and the voltage-source power converter 4. Further, FIG. 18 is a block diagram of a DC-DC converter in which the controller 5 shown in FIG. 1 additionally includes terminals that are for selecting parameter sets and a communication interface. As shown in FIG. 18, the controller 5 is desirably provided with a switching terminal for selecting the parameter sets that will be explained in detail below from outside and the communication interface.

Figure 13:
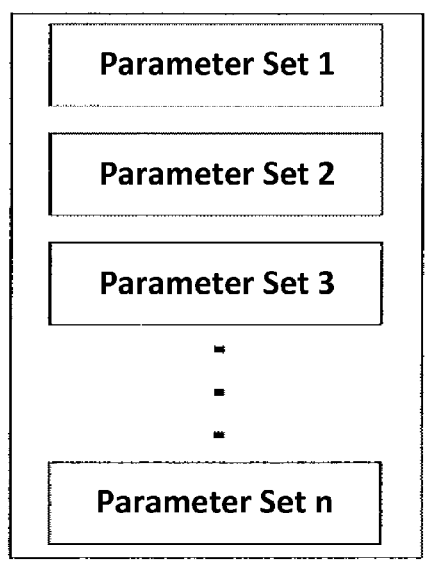
FIG. 13 is a block diagram of a parameter table and an operation setting entry.
Figure 13:
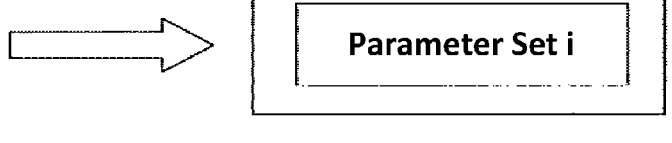

The parameter table shown in FIG. 13 is also stored in the nonvolatile memory element. The parameter table is configured with a plurality of parameter sets (a parameter set 1 . . . a parameter set n). Each parameter set corresponds to one operation mode. That is, the parameter set is maintained in the parameter table for every operation mode.

One of the parameter sets that is maintained in the parameter table is written in an operation setting entry. Then, the controller 5 controls operations of the current-source power converter 2 and the voltage-source power converter 4 based on the parameter set that is written in the operation setting entry. That is, the DC-DC converter is operated by the operation mode that corresponds to the parameter set that is written in the operation setting entry. Further, the control of the operations of the current-source power converter 2 and the voltage-source power converter 4 is not limited to the above disclosures. The control of the operations may be performed by being provided a pointer that indicates one of the parameter sets and performed based on the parameter set that is indicated by the pointer instead of the written operation setting entry.

The selection of the parameter sets, for instance, is performed based on a voltage (signal) level that is input to an input terminal of the controller 5 shown in FIG. 18. In an embodiment shown in FIG. 14, the selection of the parameter sets is performed based on the voltage (signal) level of the three input terminals. Each of the input terminals is connected to each of switches. In the embodiment shown in FIG. 14, when all of the voltage values of terminal 1, terminal 2 and terminal 3 of the controller 5 shown in FIG. 18 are in L-levels, a parameter set 1 is selected. When the voltage value of the terminal 1 is in a H-level and the voltage values of the terminal 2 and the terminal 3 are in the L-levels, a parameter set 2 is selected. When the voltage value of the terminal 2 is in the H-level and the voltage signal values of the terminal 1 and the terminal 3 are in the L-levels, a parameter set 3 is selected. When the voltage values of the terminal 1 and the terminal 2 are in the H-levels and the voltage value of the terminal 3 is in the L-level, a parameter set 4 is selected.

Figures 14, 15:
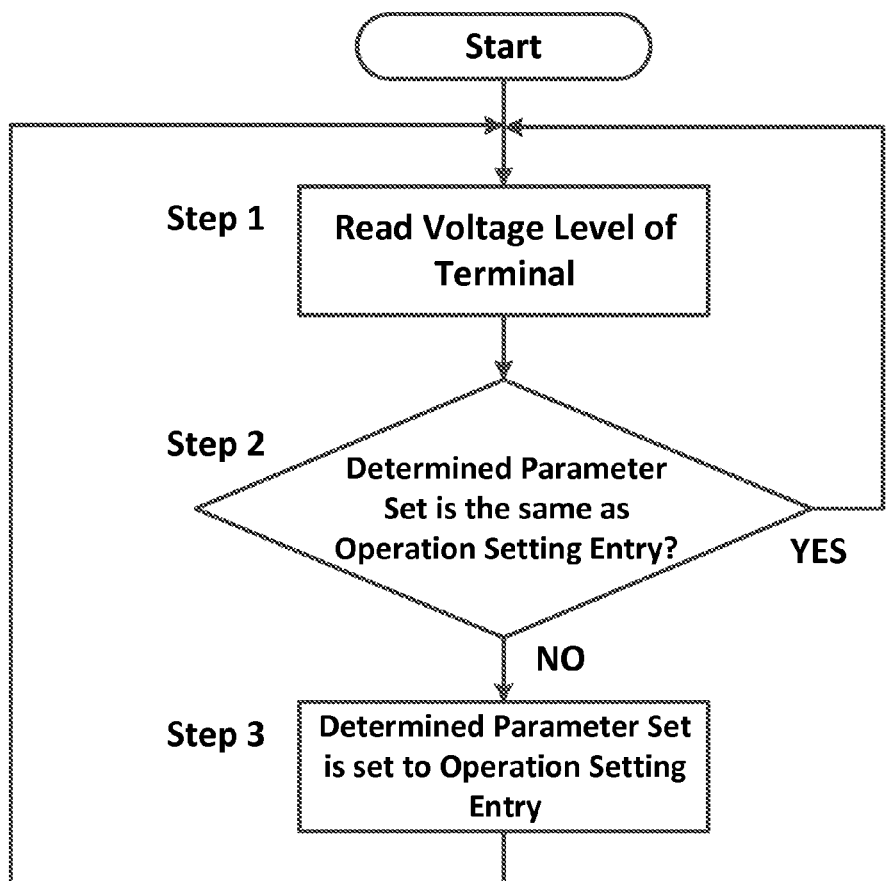
FIG. 14 is a chart showing input voltages of terminals and operation settings.
FIG. 15 is a flow diagram of an operation setting processing.

The selection of the parameter sets, that is, the setting of the operation modes is performed, for example, as shown in FIG. 15. In step 1, the voltage values of the input terminals (the terminal 1, the terminal 2 and the terminal 3) of the controller 5 are read. In step 2, a parameter set to be selected is determined based on each of the read voltage levels of each of the terminals (the terminal 1, the terminal 2 and the terminal 3). Further, the determined parameter set and the parameter set that is written (set) to the operation setting entry are compared. As a result of this comparison, when both of the above parameter sets are the same, a processing flow goes back to step 1. When both of the above parameter sets are not the same, the processing flow goes forward to step 3. In step 3, the determined parameter set based on the voltage level of each terminal is set to the operation setting entry. After the operation setting entry is set, the processing flow goes back to step 1.

Figure 16:
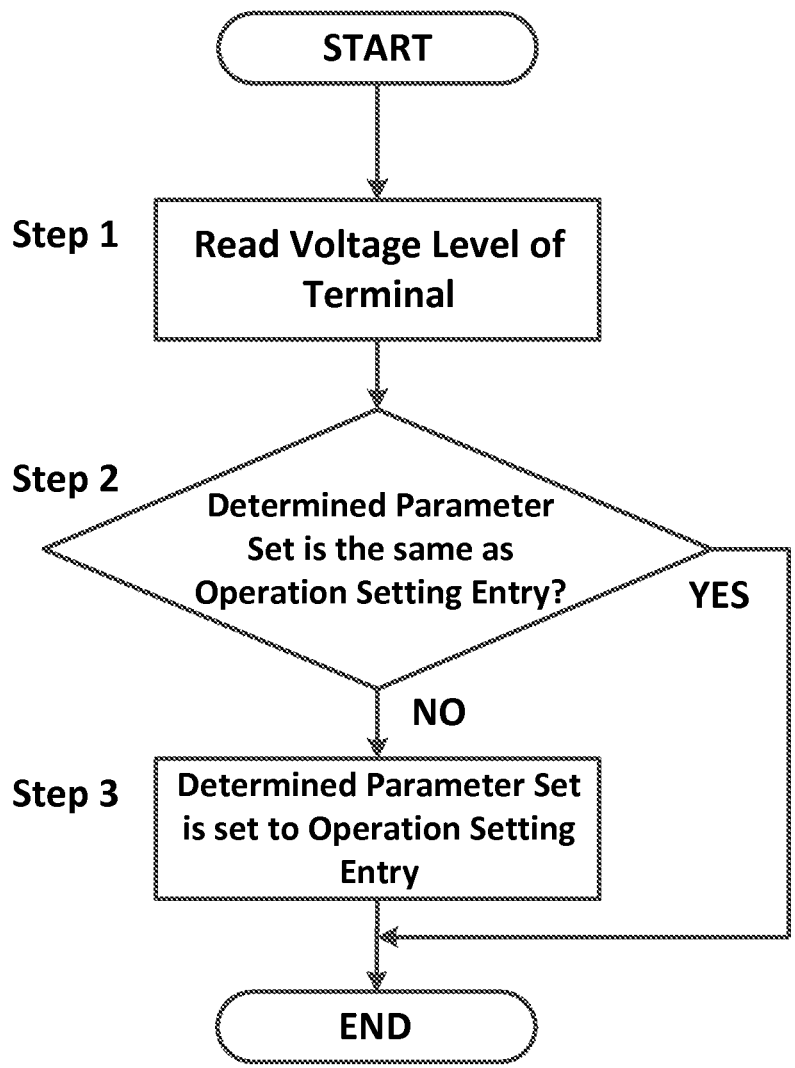
FIG. 16 is a flow diagram of an operation setting processing.

In the embodiment explained above, a setting change of the operation setting entry is performed according to the change of the voltage level that is input to the terminal. However, the change is not limited to the above. When the DC-DC converter is activated, when an interrupt signal is input to the controller 5 or when a specific command is received through the communication interface, processes shown in FIG. 16 can be performed. The embodiment shown in FIG. 16 is different from the embodiment shown FIG. 15 in the following points. In the processing flow shown in FIG. 16, as a result of a comparison of step 2, when both of the parameter sets are the same, the processing flow is finished without going back to step 1. Even after the process of step 3 is finished, the processing flow is finished.

When the operation setting entry is set (written) at the time of only activating the DC-DC converter, a malfunction caused by, for example, changing the voltage signal level of the terminal by a noise, can be prevented. Further, when the operation setting entry is set (written) at the time of input the interrupt signal to the controller 5 or at the time receiving the specific command through the communication interface, the setting of the operation setting entry can be performed whenever it is desired.

The setting change processing of the operation setting entry is explained above. A setting change processing of the pointer can also be performed in the same way. That is, in the setting change processing of the pointer, instruction information that is set at the pointer is changed. For example, instruction information that indicates the parameter set 1 is changed to other instruction information that indicates the parameter set 2.

Further, as shown in FIG. 18, the selection of the parameter sets from outside through the communication interface of the controller 5 can be performed. That is, information that indicates a parameter set for a destination of the change can be sent along with a command that indicates the setting change of the parameter set through the communication interface.

Further, the parameter table can be used by reading it out on a RAM (random access memory). Also, the parameter table can be rewritten through the communication interface (the parameter table can be updated). For example, the parameter table is rewritten in the RAM according to an indication (a command) that is given through the communication interface. Then, this rewritten parameter table is re-stored on the nonvolatile memory element. A flash memory or a FeRAM (ferroelectric random access memory) can be used as the nonvolatile memory element.

The DC-DC converter being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A DC-DC converter, comprising:
   a transformer;
   a voltage-source power converter that is provided at a primary side of the transformer;
   a first voltage detection circuit that detects a first voltage between first input and output terminals of the voltage-source power converter;
   a current-source power converter that is provided at a secondary side of the transformer;
   a second voltage detection circuit that detects a second voltage between second input and output terminals of the current-source power converter;
   a current detection circuit that detects an input-output current between the second input and output terminals of the current-source power converter; and
   a controller that controls the voltage-source power converter and the current-source power converter to transfer power between the primary side and the secondary side of the transformer, wherein
   the controller includes:
      a calculation unit that performs calculations based on the first voltage, the second voltage and the input-output current, that compares the first voltage with a first corresponding target voltage so as to generate a first current control input, that compares the second voltage with a second corresponding target voltage so as to generate a second current control input, and that compares the input-output current with the first and second current control in u s so as to generate a command value, and
      a table unit that include a plurality of parameter sets,
   the calculation unit performs the calculations based on one of the plurality of parameter sets that is selected from the table unit, and
   the controller controls the voltage-source power converter and the current-source power converter based on the command value.

2. The DC-DC converter according to claim 1, wherein
   the controller has at least one input terminal to which a signal is input,
   the controller selects one of the plurality of parameter sets from the table unit based on the input signal, and
   the input signal is different from a signal corresponding to either of the first voltage, the second voltage and the input-output current.

3. The DC-DC converter according to claim 2, wherein
   the controller selects one of the plurality of parameter sets from the table unit when the DC-DC converter starts to operate.

4. The DC-DC converter according to claim 1, wherein
   the controller selects one of the plurality of parameter sets from the table unit when the DC-DC converter starts to operate.

5. The DC-DC converter according to claim 1, wherein
   the controller further includes a communication interface unit that receives external information,
   the controller selects one of the plurality of parameter sets from the table unit based on the external information, and
   the external information is different from information corresponding to either of the first voltage, the second voltage and the input-output current.

6. The DC-DC converter according to claim 1, wherein
   the controller further includes a communication interface unit that receives external information,
   the controller updates the plurality of parameter sets of the table unit based on the external information, and
   the external information is different from information corresponding to either of the first voltage, the second voltage and the input-out current.

7. A DC-DC converter, comprising:
   a transformer;
   a voltage-source power converter that is provided at a primary side of the transformer;
   a first voltage detection circuit that detects a first voltage between first input and output terminals of the voltage-source power converter;
   a current detection circuit that detects an input-output current between the first input and output terminals of the voltage-source power converter;
   a current-source power converter that is provided at a secondary side of the transformer;
   a second voltage detection circuit that detects a second voltage between second input and output terminals of the current-source power converter; and
   a controller that controls the voltage-source power converter and the current-source power converter to transfer power between the primary side and the secondary side of the transformer, wherein
   the controller includes:
      a calculation unit that performs calculations based on the first voltage, the second voltage and the input-output current, that compares the first voltage with a first corresponding target voltage so as to generate a first current control input, that compares the second voltage with a second corresponding target voltage so as to generate a second current control input, and that compares the input-output current with the first and second control current inputs so as to generate a command value, and
      a table unit that include a plurality of parameter sets,
   the calculation unit performs the calculations based on one of the plurality of parameter sets that is selected from the table unit, and
   the controller controls the voltage-source power converter and the current-source power converter based on the command value.

8. The DC-DC converter according to claim 7, wherein
   the controller has at least one input terminal to which a signal is input,
   the controller selects one of the plurality of parameter sets from the table unit based on the input signal, and the input signal is different from a signal corresponding to either of the first voltage, the second voltage and the input-output current.

9. The DC-DC converter according to claim 8, wherein the controller selects one of the plurality of parameter sets from the table unit when the DC-DC converter starts to operate.

10. The DC-DC converter according to claim 7, wherein the controller selects one of the plurality of parameter sets from the table unit when the DC-DC converter starts to operate.

11. The DC-DC converter according to claim 7, wherein the controller further includes a communication interface unit that receives external information, the controller selects one of the plurality of parameter sets from the table unit based on the external information, and the external information is different from information, corresponding to either of the first voltage, the second voltage and the input-output current.

12. The DC-DC converter according to claim 7, wherein the controller further includes a communication interface unit that receives external information, the controller updates the plurality of parameter sets of the table unit based on the external information, and the external information is different from information corresponding to either of the first voltage, the second voltage and the input-output current.

\* \* \* \* \*